Dec. 29, 1925.  T. K. STANTON  1,567,627
SNOWPLOW FOR MOTOR VEHICLES
Filed Nov. 15, 1924   2 Sheets-Sheet 1
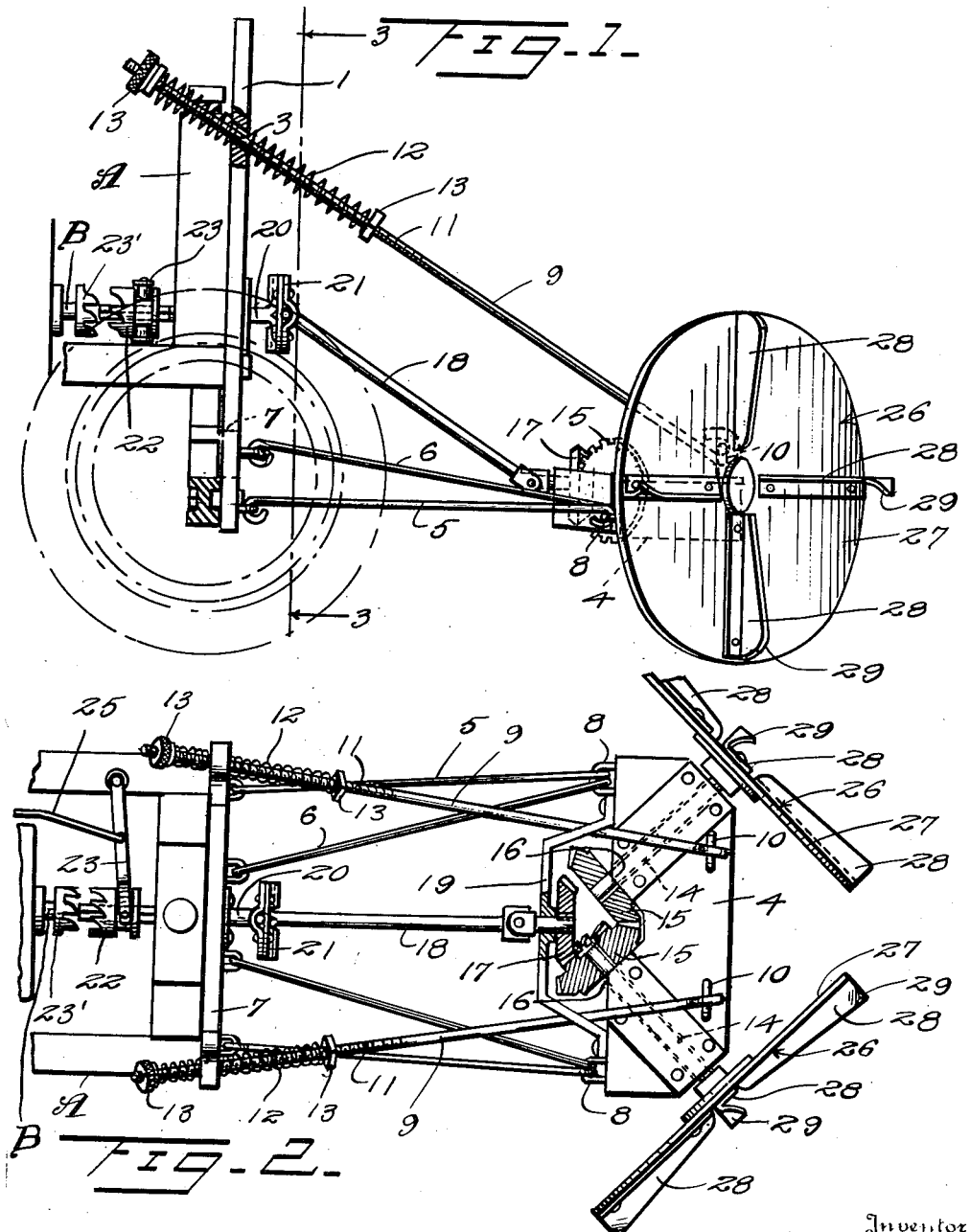
Inventor
T. K. Stanton.
By Jacobi & Jacobi
Attorneys Dec. 29, 1925.  1,567,627
T. K. STANTON
SNOWPLOW FOR MOTOR VEHICLES
Filed Nov. 15, 1924   2 Sheets-Sheet 2

Inventor
T. K. Stanton.
By Jacobi & Jacobi
Attorneys

Patented Dec. 29, 1925.

1,567,627

UNITED STATES PATENT OFFICE.

THOMAS K. STANTON, OF BRUSETT, MONTANA.

SNOWPLOW FOR MOTOR VEHICLES.

Application filed November 15, 1924. Serial No. 750,084.

*To all whom it may concern:*

Be it known that THOMAS K. STANTON, a citizen of the United States, residing at Brusett, in the county of Garfield and State of Montana, has invented certain new and useful Improvements in Snowplows for Motor Vehicles, of which the following is a specification.

This invention relates to a snow plow for a motor vehicle and has for its principal object to provide a simple and efficient device which will clear a road of snow and is of such a construction as to enable the same to be adjusted to the proper position whereby all of the snow will be removed from the center of the road and swept to the side.

Another important object of the invention is to provide a snow plow attachment for motor vehicles of the above mentioned character, which includes a pair of simultaneously operated fans which are adapted to rotate in opposite directions and which will cause the snow to be swept or blown off of the road to the sides thereof, the fans being so arranged as to enable the same to properly function in a simple and efficient manner.

A still further object of the invention is to provide a snow plow adapted to be attached to the forward end of a motor vehicle and which will be controlled by the operator of the motor vehicle without having to leave the seat of the vehicle in order to adjust the device to the proper operative positions.

An equally important object of the invention is to provide a snow plow attachment of the above mentioned character, which includes a means for raising and lowering the same to the proper vertically adjusted position so as to accommodate the use thereof upon grades of various inclinations, and furthermore enable the snow plow to be readily effective in its operation over grades having irregularities therein.

Another important object of the invention is to provide a snow plow attachment for motor vehicles which is adapted to be driven by the engine of the motor vehicle and having the driving connection associated with the crank shaft thereof.

A further object of the invention is to provide a snow plow attachment for motor vehicles which is simple in construction, inexpensive, strong and durable and further, well adapted for the purposes for which it is designated.

Other objects and advantages of this invention will become apparent during the course of the following description.

In the accompanying drawings forming a part of the specification and in which like numerals designate like parts throughout the same.

Figure 1 is a side elevation of my device showing the same in position upon the forward portion of a motor vehicle.

Figure 2 is a top plan view thereof.

Figure 3:
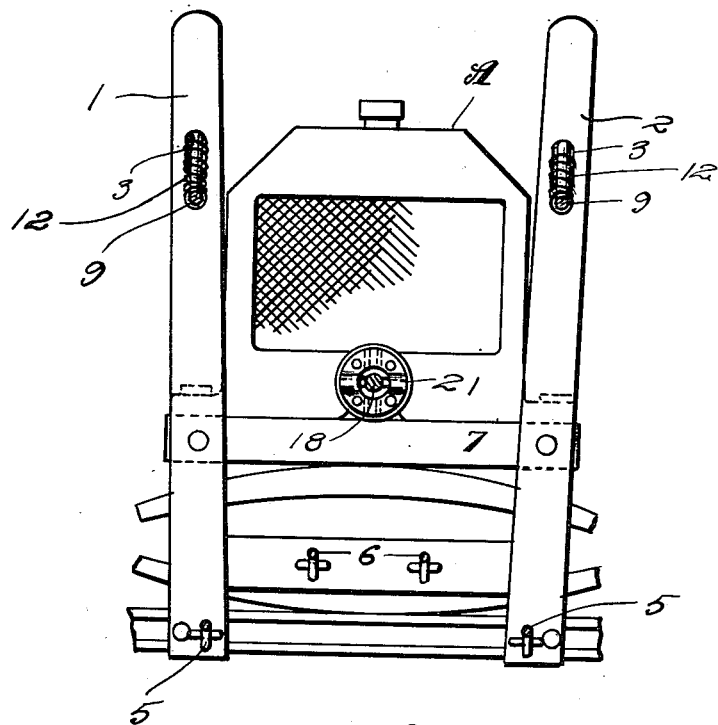
Figure 3 is a vertical section taken on line 3—3 of Figure 1.
Figure 4:
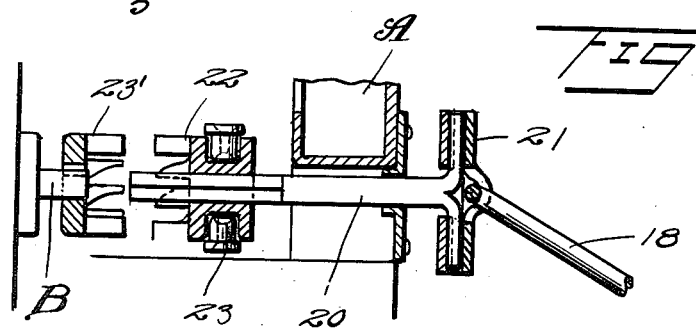
Figure 4 is a fragmentary detail section through one end of the motor vehicle and showing the driving connection.

In the drawings wherein for the purpose of illustration is shown the preferred embodiment of my invention, the numerals 1 and 2 designate vertical standards which are formed of any suitable material, preferably steel and are in the form of bars. These standards are secured to the forward end of a motor vehicle designated generally by the letter A in any suitable manner, and are so supported thereon as to be arranged in spaced relation as clearly shown in Figure 3 of the drawings. Adjacent the upper ends of these vertical standards are the elongated slots 3 and the purpose of providing these standards with these slots will be hereinafter more fully described.

Pivotally supported upon the lower end of the vertical standards 1 and 2 and arranged a suitable distance therefrom is the frame designated by the numeral 4. This frame may be supported upon or by the standards by means of the side supporting rods 5 and the centrally located supporting rods 6, the centrally located supporting rods 6 being adapted for pivotal connection with the suitable transverse bar 7 which extends between the vertical standards 1 and 2 and adjacent the lower ends thereof and is furthermore secured to the forward end of the motor vehicle in the manner as clearly shown in Figure 3 of the drawings. It is to be understood that these supporting rods are pivotally connected to the rear portion of the frame 4 by having the forward ends of the wire in secured engagement with suitable eyes such as is shown at 8 in the drawings, extending from the rear end of the frame.

For the purpose of raising and lowering the frame 4 attached to the motor vehicle A whenever the case necessitates, I provide the elongated rods 9. The lower ends of these rods are in hooked engagement with suitable eyes 10 provided in the face of the frame 4 adjacent the forward end thereof, and these elongated rods are adapted to extend rearwardly and upwardly and have their upper ends threaded for a substantial distance as shown at 11 in the drawings. The threaded ends of these elongated rods are adapted to extend through the elongated slots 3 provided in the upper ends of the vertical standards 1 and 2 and suitable coil springs such as is shown at 12 in the drawings are disposed around the threaded portions of each of the elongated rods on each side of the vertical standards.

Suitable nuts such as are shown at 13 in the drawings are threaded on the threaded part 11 of the elongated rods in the manner as shown in the drawings whereby upon the turning of the nuts in one direction the coil springs 12 are caused to be compressed and the rods are moved upwardly so as to raise the frame vertically. If the frame is desired to be lowered, the adjusting nuts 13 are rotated in the opposite direction and the frame will then be permitted to be lowered to the proper position and held therein by means of the coil spring 12 acting against the vertical standard and the nuts. The purpose of this arrangement is to provide a means whereby the frame and the rotary fans carried thereby and which will hereinafter be more fully described to be adjusted to accommodate its use for grades having a number of irregularities therein and also grades of various inclinations.

Journaled in the frame 4 are the driven shafts 14. These shafts are so arranged or journaled in suitable boxes within the frame 4 as to diverge outwardly from their inner ends. The inner ends of the driven shafts 14 are provided with suitable bevel pinions 15 and for the purpose of permitting the proper functioning of these bevel pinions 15, the frame 4 is cut away in its rear portion as shown at 16 in the drawings. For the operating of the rotating of the bevel pinions 15 and shafts 14 simultaneously in opposite directions, I provide a suitable bevel gear 17 which is supported upon the lower end of the driving shaft 18. This driving shaft 18 is properly supported adjacent the lower end by means of a suitable bracket 19 which is secured to the rear portion of the frame in the manner clearly shown in Figure 2.

The upper end of the driving shaft 18 is connected to a short section or shaft 20 by means of a universal connection such as is shown at 21 and this shaft 20 extends through the forward end of the motor vehicle in the same manner in which the crank handle extends therethrough for the purpose of connection with the crank shaft B of the motor vehicle. Slidably mounted upon the inner free ends of the shaft 20 is a clutch element 22 and this clutch element 22 is carried by a suitable lever 23 which may be supported in the interior of the motor vehicle in any suitable manner, the purpose of this clutch element 22 being to provide a means for engagement with the driving pin 23' which is carried by the crank shaft B in the well known manner. For the purpose of controlling the operation of the driving shaft 18 the pivoted lever 23 carrying the slidable clutch 22 is associated with an elongated wire or rod such as is shown at 25 in the drawings and this wire 25 extends through the dash of the motor vehicle whereby the same may be easily operated by the operator of the motor vehicle. The purpose and operation of this arrangement will be more fully described in the following paragraph.

Mounted upon the outer ends of the driven shafts 14 which are journaled in the frame 4 are the fans designated generally by the numeral 26, each of these fans include a disc 27 of any suitable design and each disc is provided with a plurality of blades 28 which extend at right angles to one another and also to the plane of the discs upon which the same are mounted. These blades may be detachably supported upon the discs whereby same may be readily removed and replaced after the same have been used for a considerable length of time whenever the case necessitates and the manner of mounting these blades such as to permit the same to be readily removed, it is not thought necessary at this time to go into detail as to the construction of the same as this feature alone plays no important part of the present invention.

If desired, the outer ends of the blades 28 may be turned down as shown at 29 but this arrangement is not essential to the proper operation and use of the same.

With the parts arranged as shown in Figure 1 of the drawings, the slidable clutch 22 is normally out of engagement with pin 23 mounted upon the crank shaft B whereby the fans are held in an inoperative position and when it is desired to use the snow plow in removing the snow from the road, the frame 4 is adjusted to the proper position so as to assure the fans to properly function and by actuating the wire or rods 25 from the dash of the motor vehicle, the operator throws the clutch 22 into engagement with the pin 23 on the crank shaft B and the driving shaft 18 will be caused to rotate and in turn impart rotary motion to the shafts 14 through the medium of the bevel gear 17 and the bevel pinions 15. As stated above, the shafts 14 will be caused to rotate simultaneously in opposite direction, thereby causing the blades on the fan 26 to sweep the snow from the center of the road to the sides, thereby clearing the road of snow.

Furthermore by providing a snow plow of the above mentioned character upon the forward end of the motor vehicle, in the manner as above described the same may be properly adjusted so as to accommodate its use to the irregularities in the road or grade over which the same is traveling and will produce the proper result in a simple and efficient manner. The simplicity in which my device is operated by the operator of the motor vehicle from the seat of the same enables the device to be controlled without necessitating the stopping of the engine in order to adjust the parts to their proper positions and to further control the operation of the snow plow.

From the foregoing description of the construction of my improved apparatus, it will be seen that I have provided a simple inexpensive and efficient means for carrying out the objects of the invention, and while I have particularly described the elements best adapted to perform the functions set forth, it is obvious that various changes in form, proportion, and in the minor details of construction may be resorted to, without departing from the spirit or sacrificing any of the principles of the invention.

Having thus described my invention, what I claim is:

1. The combination with a motor vehicle; of a snow plow comprising a pair of vertical standards supported on the forward end of said vehicle, a frame pivotally carried on said standards, rotary fans carried on the outer ends of said frame, means for rotating said fans, rods connecting the outer end of said frame with the upper ends of said standards, and means in connection with said standards and the upper ends of said rods for yieldingly and adjustably securing the same in position whereby to support the frame in various adjusted positions.

2. The combination with a motor vehicle including the crank shaft thereof, of a snow plow comprising a pair of vertical standards mounted on the forward end of said vehicle, a frame pivotally supported thereon, a pair of elongated rods connected at their lower ends to said frame and having their upper ends threaded and extending through the elongated slots provided in the upper ends of said standards, means associated with the threaded upper ends of said rod for holding said frame in vertically adjusted positions, a pair of rotary fans mounted in said frame, and driving means associated with said fans for rotating the same in opposite directions and adapted for engagement with said crank shaft.

3. The combination with a motor vehicle including the crank shaft thereof, of a snow plow comprising a pair of vertical standards mounted on the forward end of said vehicle, a frame pivotally supported thereon adjacent the lower end thereof and arranged in spaced relation thereto, means carried by said frame and adapted to extend through slots provided in the upper end of said standards for holding said frame in vertically adjusted positions, a pair of outwardly diverging shafts journaled in said frame, fans mounted on the outer ends of said shafts, bevel pinions, mounted on the inner ends of said shafts, a drive shaft having a bevel gear at its lower end connected with the bevel pinions for rotating said shafts simultaneously in opposite directions, and means associated with the upper end of said drive shafts for moving the same into and out of engagement with said crank shaft.

In testimony whereof I affix my signature.

THOMAS K. STANTON.